Dec. 25, 1956  N. S. ELLIS  2,775,725
ELECTRIC RELAY DEVICES
Filed May 22, 1953  3 Sheets-Sheet 1
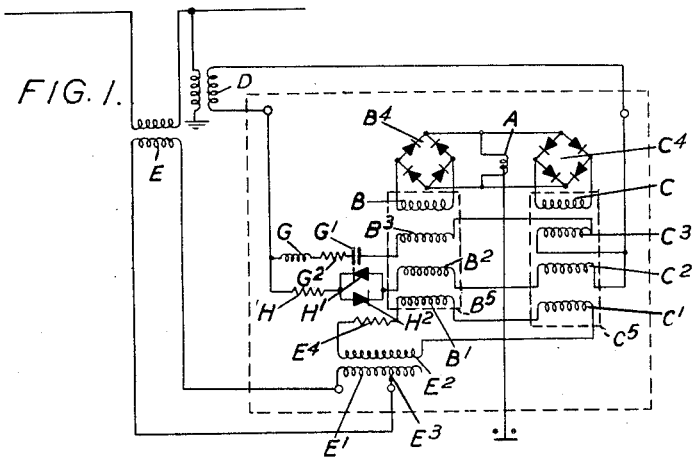
FIG. 1.
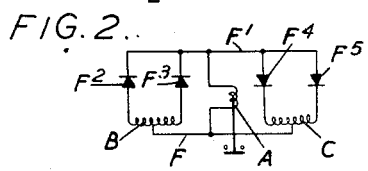
FIG. 2.
FIG. 3.  FIG. 4.
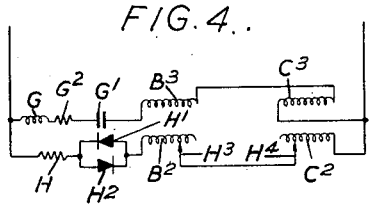
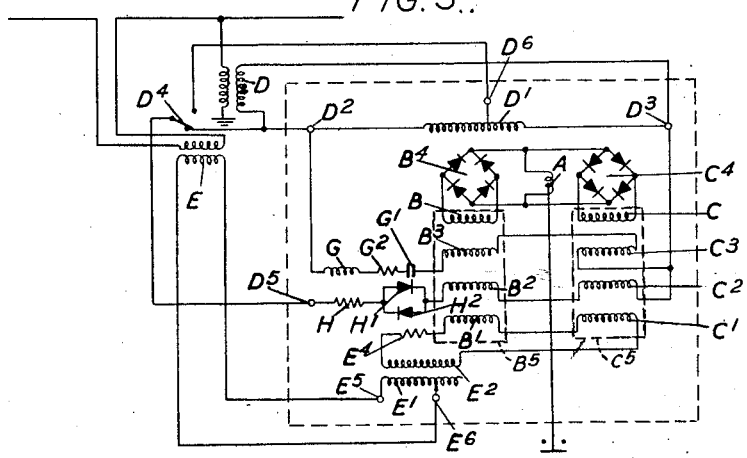
FIG. 5.
*Inventor*
Norman S. Ellis
By Watson Cole
Grindle & Watson
*Attorneys*

Dec. 25, 1956  N. S. ELLIS  2,775,725
ELECTRIC RELAY DEVICES
Filed May 22, 1953  3 Sheets-Sheet 2
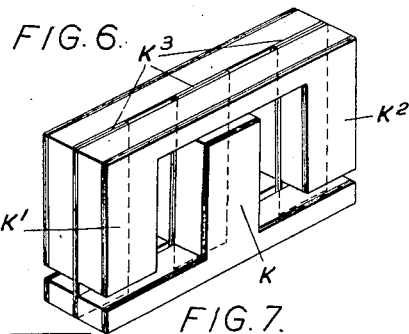
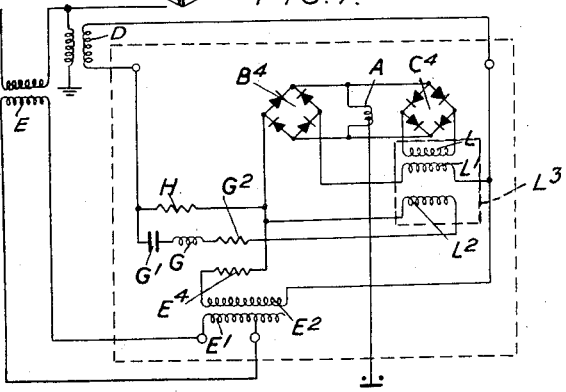
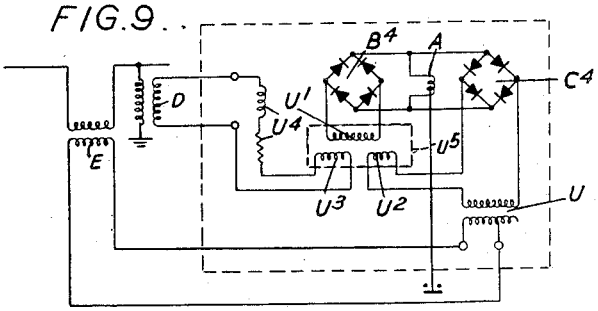
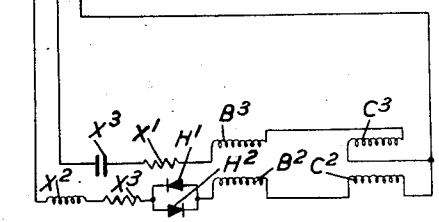
Inventor
Norman S. Ellis
By Watson, Cole,
Grindle & Watson
Attorneys

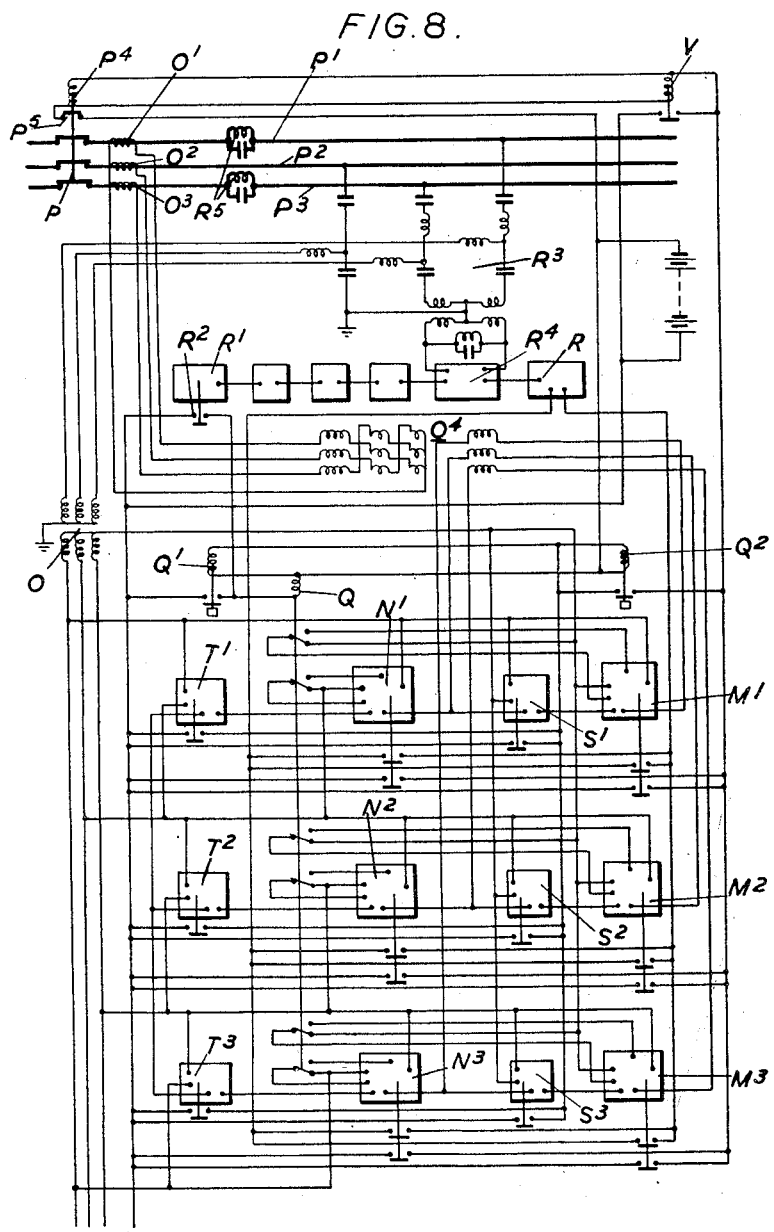

United States Patent Office 2,775,725
Patented Dec. 25, 1956

2,775,725

ELECTRIC RELAY DEVICES

Norman Sadler Ellis, South Shields, England, assignor to A. Reyrolle & Company Limited, Durham, England, a company of Great Britain Application May 22, 1953, Serial No. 356,790

Claims priority, application Great Britain May 27, 1952

27 Claims. (Cl. 317—36)

This invention relates to an electric relay device of the directional and impedance type responsive to the conditions in a main electric circuit. Although applicable to other purposes, the relay device according to the invention finds especially useful application in an electric protective arrangement of the distance type for a feeder or other circuit. In such a protective arrangement a protective relay is caused to respond to the impedance of the fault loop, which is a measure of the distance of the fault from the relay station, and acts to cut out the protected main circuit when such impedance is less than a predetermined value. In this arrangement, as also in various other protective arrangements, it is often desirable for the protective gear to be normally out of circuit and to be brought into circuit by a directional starting relay operative on the occurrence of a fault on the main circuit in a chosen direction from the relay station. The relay device according to the invention is suitable for use in one form in such arrangements as a starting relay, wherein the directional feature of the device is of primary importance and highly accurate measurement of impedance is not required, or in another form in a distance protective arrangement as the protective relay, wherein accurate measurement of impedance is called for, the directional feature of the relay device rendering it unnecessary to employ a directional starting relay.

In a known distance protective arrangement of the above-mentioned type, the protective relay is of the kind sometimes known as a "mho" relay device having a characteristic reactance-resistance curve in the form substantially of a circle, usually passing through the origin of coordinates. One known form of mho relay device comprises a polarised D. C. relay energised differentially through rectifiers from two A. C. inputs which are functions of the voltage and the current in the main circuit, one of the inputs being proportional to the current in the main circuit, whilst the other consists of the vectorial sum of two currents respectively proportional to the main voltage and the main current. This known form of mho relay device operates very satisfactorily except when the impedance is nearly zero, the characteristic curve being in the form of a circle slightly flattened in the neighbourhood of the origin of coordinates. As a result, this relay device will fail to operate in the event of a fault very close to the relay station.

The present invention has for its object to provide an improved directional and impedance relay device, which can be advantageously employed for various purposes, but which, when arranged as a mho relay device, can readily be adapted to operate satisfactorily close to the zero impedance value.

The improved directional and impedance relay device according to the invention comprises a polarised D. C. relay element, and means for applying differentially to such element two rectified A. C. inputs, one A. C. input comprising the vectorial difference between an operating current proportional to a current of the main circuit and the sum of a restraining current proportional to a voltage of the main circuit and a polarising current which is derived from a voltage of the main circuit and is approximately in phase with the restraining current, whilst the other A. C. input comprises the vectorial difference between the restraining current and the sum of the operating and polarising currents. It should be mentioned that it is not important whether or not the polarising current is proportional in magnitude to the main circuit voltage from which it is derived, the important factor being the phase relationship of this current to the restraining current.

Whilst other arrangements may be used, each A. C. input is preferably obtained from the secondary winding of a mixing transformer having three primary windings, each of the primary windings of one mixing transformer being connected in series with the corresponding winding of the other mixing transformer in a circuit energised in accordance with the appropriate main circuit current or voltage.

The rectifiers between the A. C. inputs and the D. C. relay element may be arranged in various ways. In one convenient arrangement the D. C. relay element is connected across the output circuit of a rectifier-comparator circuit comprising two full-wave bridge rectifiers whose input terminals are respectively energised by the two A. C. inputs, the output terminals of one bridge rectifier being connected to those of the other in the output circuit in such a sense as to permit current to circulate around the output circuit. In an alternative arrangement, for use when the A. C. inputs are derived through mixing transformers, the D. C. relay element is connected between two leads together constituting the output circuit of a rectifier comparator circuit, one of such leads connecting the midpoints of the two mixing transformer secondary windings, whilst the other lead connects two pairs of half-wave rectifiers, the two rectifiers of each pair being respectively connected to the two ends of the corresponding secondary winding in such senses as to permit current to circulate around the output circuit.

In one construction of relay device according to the invention, intended for accurate impedance measurement for protective purposes and arranged to have a mho characteristic, the operating current is derived from the main circuit current associated with the impedance to be measured, and the restraining and polarising currents are derived from the main circuit voltage associated with the impedance to be measured.

In order to render the relay device satisfactorily responsive to impedance values close to zero, in this construction, a memory device is preferably provided in the voltage-responsive circuit from which the polarising current is derived, for temporarily sustaining the polarising current in the event of a sudden fall in the main circuit voltage from which such current is derived. Such memory device may be arranged in various ways, but preferably takes the form of a resonant circuit tuned to the frequency of the main circuit. In such case, when the polarising and restraining currents are in phase with the main circuit voltage or voltages from which they are derived, a series resonant circuit would be used, whilst when such currents are 90° out of phase with the main circuit voltage or voltages, a parallel resonant circuit would be used.

In an alternative construction of relay device for use as a directional relay with impedance control, for example for starting purposes in a protective arrangement, the polarising and restraining currents are respectively derived from two different main circuit voltages through circuits including series impedances such as to bring the polarising and restraining currents approximately into phase with one another.

The restraining current is preferably derived from the main circuit voltage through a circuit including a compensating voltage-limiting device, which may for example consist of a pair of opposed half-wave rectifiers connected in parallel or of a reactor whose magnetic core has an airgap bridged by a small magnetic shunt. When the A. C. inputs are obtained through mixing transformers, each primary winding associated with the restraining current may conveniently have two tappings for varying the impedance setting of the relay device, the two tappings being so chosen as to require the same value of voltage-limiting device for correct compensation.

The invention may be carried into practice in various ways but some convenient practical arrangements according thereto are illustrated in the accompanying drawings, in which Figure 1 shows one convenient arrangement of relay device according to the invention, Figures 2–4 illustrate modifications of the relay device of Figure 1, Figure 5 shows an alternative arrangement of relay device according to the invention, Figure 6 illustrates a convenient compensating voltage-limiting device for use in the relay device according to the invention, Figure 7 shows a further alternative arrangement of relay device according to the invention, Figure 8 illustrates an electric protective arrangement of the distance type incorporating relay devices of the kind shown in Figure 5, Figure 9 illustrates details of a mho relay device utilised in the protective arrangement of Figure 8, and Figure 10 shows another alternative arrangement of relay device according to the invention.

The relay device shown in Figure 1 has a mho characteristic and is intended for accurate impedance measurement, for example for use in a distance protective system. In this arrangement, a polarised D. C. relay element A is energised through a rectifier comparator circuit from two A. C. inputs, each of which is obtained from the secondary B or C of a mixing transformer $B^5$ or $C^5$ having three primary windings $B^1B^2B^3$ or $C^1C^2C^3$, one of which $B^1$ or $C^1$ is energised through a current transforming device (diagrammatically indicated at E) in accordance with the current in the main circuit associated with the impedance to be measured, whilst the other two $B^2B^3$ or $C^2C^3$ are each appropriately energised through a voltage transforming device (diagrammatically indicated at D) from the voltage in the main circuit associated with the impedance to be measured.

The rectifier comparator circuit, in the arrangement shown in Figure 1, consists of two full-wave bridge rectifiers $B^4$ and $C^4$, the input terminals of each of which are connected to the two ends of the secondary winding B or C of the associated mixing transformer. The two output terminals of one bridge rectifier $B^4$ are directly connected to those of the other bridge rectifier $C^4$ in such a sense as to permit current to circulate around the output circuit thus formed. The D. C. relay element A is connected across such output circuit.

With this arrangement the current in the relay element A will be of one polarity when the A. C. input to the first bridge rectifier $B^4$ exceeds that to the second bridge rectifier $C^4$ and of the opposite polarity when the input to the second rectifier $C^4$ is the greater. Since the relay element A is polarised, it will respond only when the input to the first rectifier $B^4$ exceeds that to the second. A highly sensitive D. C. relay element, preferably of the moving coil type, is used so that the excess of one input over the other required to operate the relay element can be kept small.

The rectifier comparator circuit may, however, be arranged in other ways. For example, as shown in Figure 2, the midpoints of the secondary windings B and C of the two mixing transformers may be directly connected together at F to form one side of the output circuit, the other side of such circuit being constituted by a lead $F^1$ which is connected through two half-wave rectifiers $F^2F^3$ of the same polarity to the two ends of one secondary winding B and through two further half-wave rectifiers $F^4F^5$ to the two ends of the other secondary winding C, the latter two rectifiers $F^4F^5$ being of the same polarity as each other but of opposite polarity to the first two $F^2F^3$. The relay element A is again connected across the output circuit.

The three primary windings $B^1B^2B^3$ of one mixing transformer $B^5$ are respectively connected in series with the corresponding windings $C^1C^2C^3$ of the other mixing transformer $C^5$ and are energised respectively by an operating current, a restraining current and a polarising current.

The operating current is proportional to the appropriate main circuit current from which it is derived through an airgap transformer $E^1E^2$ having tappings on its primary winding $E^1$. By adjustment of this tapping point $E^3$, the impedance value at which the relay element A will respond can be altered. The primary winding $E^1$ of this airgap transformer is energised from an appropriate current transformer or transformers E on the main circuit, whilst its secondary winding $E^2$ is connected through a resistance $E^4$ to the first primary windings $B^1$ and $C^1$ of the two mixing transformers. This arrangement is also of especial value for giving a chosen phase shift in the resultant characteristic such that the relay element A will operate at a given impedance at a given phase angle.

The restraining current is proportional to the appropriate main circuit voltage, and the two series-connected primary windings $B^2$ and $C^2$ of the mixing transformers energised thereby are connected in series with an impedance H to the secondary winding D of the appropriate voltage transformer on the main circuit.

The polarising current is preferably derived from the same main circuit voltage, so that the polarising circuit is in parallel with the restraining circuit, the two series-connected mixing transformer primary windings $B^3$ and $C^3$ in the polarising circuit being in series with an impedance $GG^1G^2$ of different value from that in the restraining circuit, one of the primary windings $C^3$ in the polarising circuit, however, being connected in the reverse sense.

The senses in which the various primary windings are connected is such that in one mixing transformer $BB^1B^2B^3$, the polarising and restraining vectors are added together and the operating vector is subtracted from the sum, whilst in the other mixing transformer $CC^1C^2C^3$ the polarising vector is added to the operating vector and the restraining vector is subtracted from the sum.

It can be shown that with this arrangement (if the current through the relay element A is small in comparison with the rectified A. C. inputs) the relay element will operate when the main circuit impedance is less than a quantity equal to the product of the series impedance H in the restraining circuit and a function of the phase angles between the operating, restraining and polarising currents, provided that the main circuit impedance is not itself substantially zero. It is particularly to be noted that the critical quantity for determining whether the relay element A will operate or not is independent of the value of the series impedance $GG^1G^2$ in the polarising circuit. This makes it possible to provide a memory device in the polarising circuit to enable the relay element to respond also to zero main circuit impedance, without affecting the operation of the relay element for other values of the main circuit impedance.

This memory device, although it may be arranged in other ways, preferably takes the form of a resonant circuit, comprising inductance G and capacitance $G^1$, tuned to the frequency of the main circuit so as to appear as a resistive impedance under steady-state conditions. It is important that the series impedances in the polarising and restraining circuits should be such that the currents in these circuits are approximately in phase with one another, but it is not essential that these two currents should be in phase with the main circuit voltage from which they are derived. If they are in phase with the main circuit voltage, the memory device will consist (as shown in Figure 1) of a series resonant circuit, comprising inductance G in series with capacitance $G^1$, but if the two currents are each 90° out of phase with the main circuit voltage (see Figure 3), the memory device should take the form of a parallel resonant circuit comprising capacitance $G^3$ in parallel with the inductance G and with the two primary windings $B^3C^3$.

The effect of providing this memory device $GG^1$ or $GG^3$ is that, when the main circuit voltage collapses on the occurrence of a fault, the memory device will maintain a substantial flow of current in the polarising circuit for a short time sufficient to allow the relay element A to operate. Thus if in the event of a fault the main circuit voltage collapses substantially to zero, the relay element A will operate for a short period, owing to the effect of the memory device, and will then reset again. Whilst it will often be possible to arrange for this brief operation of the relay element to be long enough to effect the cutting out of the main circuit, when the relay device is employed for protective purposes, it will usually be preferable to include a contactor which is controlled by the relay element and makes its own holding circuit to ensure that it will remain energised long enough to cut out the main circuit. Such an arrangement will be described later with reference to Figure 8.

The fact that the relay element A requires a finite current for operation introduces an error in the impedance measurement, and this error increases rapidly for small values of the main circuit voltage and current. Compensation for this error, can, however, be obtained by including a voltage limiter in the restraining circuit. This limiter can conveniently take the form of two opposed half-wave rectifiers $H^1H^2$ connected in parallel with one another.

In practice it is preferable to interrelate the values of the series impedances $GG^1G^2$ and H in the polarising and restraining circuits with the impedance of the relay element A. Thus, it is desirable so to choose the transformer ratios that the effective value of the impedance $GG^1G^2$ in the polarising circuit is equal to four times that of the relay element A. A similar relationship between the impedance H in the restraining circuit and the impedance of the relay element A is also desirable, with the proviso that the impedances in the polarising and restraining circuits must be different from one another. It may, however, be convenient (as shown in Figure 4) to provide tappings $H^3H^4$ on the primary windings $B^2C^2$ in the restraining circuit, in order to provide large steps in the adjustment of the impedance value at which the relay element A operates, thus simplifying the means provided in the operating circuit for effecting adjustment of such value. This, however, gives rise to a practical difficulty that a different value of compensation would be needed for each such tapping. It is, however, possible to have two tappings $H^3$ and $H^4$ such that the same compensation is required, provided that their numbers of turns $n_1$ and $n_2$ are such that $n_1n_2=n^2$, where $n$ is the number of turns for correct matching of the series impedance in the restraining circuit to four times the impedance of the relay element A.

In the arrangement of Figure 1, the tapping $E^3$ on the airgap transformer $E^1E^2$ through which the operating current is supplied has been described as the means for altering the impedance value at which the relay element A will operate. It is sometimes convenient, however, to provide additional means for fixing a stepped variation of the impedance setting of the relay device. One such arrangement is shown in Figure 5, wherein an auto-transformer $D^1$ is connected between the terminals $D^2$ and $D^3$ through which the voltage transformer secondary D is connected to the relay device. The polarising circuit is connected to the terminal $D^2$, as before, but by connecting the intermediate tapping point of the auto-transformer $D^1$ to the restraining circuit, the impedance setting of the relay device becomes dependent on the position of such tapping point. The arrangement actually shown in Figure 5 provides for a single step change in the relay device setting under the control of a change-over switch $D^4$, the actuating arm of which is connected to a terminal $D^5$ connected to the restraining circuit, whilst its two operating contacts are connected respectively to the terminal $D^2$ and to a terminal $D^6$ connected to the auto-transformer tapping point. Thus, in the position of the change-over switch $D^4$ shown in the drawing, the polarising and restraining circuits are both connected directly to the terminal $D^2$, as in the arrangement of Figure 1, the auto-transformer tapping point being inoperative whilst in the other operative position of the change-over switch $D^4$, the restraining circuit terminal $D^5$ is disconnected from the terminal $D^2$ and is connected instead to the auto-transformer tapping terminal $D^6$, to give a reduced energisation of the restraining circuit relatively to that of the polarising circuit.

Figure 6 illustrates an alternative voltage-limiting device which may be employed in the restraining circuit, in place of the opposed rectifiers $H^1H^2$, in cases where reactance is required in such circuit. In this case, voltage-limiting is obtained by providing a small shunt magnetic path across the airgap of the reactor. In the example illustrated, the magnetic core of the reactor has three limbs $KK^1K^2$ with an airgap in each limb. The core is laminated in the usual manner, and the small shunt path is afforded by replacing one or two of the ordinary stampings by stampings $K^3$ of different shape, which bridge the airgaps. If a very small voltage is applied to a reactor having such a core, the reactance is very high owing to the complete magnetic path afforded by the shunt stampings. This shunt path is arranged to saturate at a small value of the applied voltage and for larger voltages the device behaves as an ordinary airgap reactor. The resulting curve of voltage against current is linear except for the range of small voltage values.

In the foregoing arrangements, the combination of the operating, restraining and polarising vectors is effected by means of mixing transformers, but this is not essential to the invention, and in one alternative arrangement, shown in Figure 7, the three vectors are directly added together for the second of the two A. C. inputs, the first A. C. input being obtained by subtracting the appropriate vector therefrom in a transformer $L^3$ having two primary windings $L^1L^2$ and a secondary winding L. In this alternative arrangement, the operating current source is connected through one of such primary windings $L^1$ to the input terminals of the second bridge rectifier $B^4$, and the restraining and polarising current source is also connected through the appropriate impedances H and $GG^1G^2$ for these two circuits in parallel to the input terminals of the same rectifier $B^4$ but in the sense opposite to that for the operating current, the polarising current circuit being taken through the second primary winding $L^2$. It will thus be clear that the desired input to the second rectifier $B^4$ is obtained and that this input is also passed through the first primary winding $L^1$. The second primary winding $L^2$ is connected in such a sense and has such a number of turns, that the first A. C. input derived from the secondary winding L is equal to the second A. C. input less twice the polarising current vector. The various modifications described above for the first arrangement can readily be applied to this alternative arrangement.

The relay device in any of the embodiments above described is especially suitable for use as the protective relay in a protective arrangement of the distance type. It will give accurate impedance measurement over a wide range extending right down to zero and it has the further great advantage that the measurement is determined by static components without any moving parts, except for the actual relay element. Another valuable feature is that it is directional in operation, so that it will operate only when the fault is in one direction from the relay station and at a distance therefrom less than a chosen value. The arrangement also enables the operating time to be reduced by avoiding the necessity for sequential operation of directional starting relays in addition to the protective relays.

This relay device is especially convenient for use in the distance protective arrangement forming the subject of the copending United States of America patent application Serial No. 279,898, now abandoned. Such an arrangement, using the embodiment of the relay device shown in Figure 5, is illustrated in Figure 8. In this arrangement, six such relay devices are used, three $M^1M^2M^3$ for dealing with earth faults and three $N^1N^2N^3$ for interphase faults, each of such relay device being represented in Figure 8 by a square and six terminals corresponding to the dotted square and the terminals $D^2D^3D^5D^6E^5E^6$ shown in Figure 5. The operating circuits of these six relay devices are energised from current transformers $O^1O^2O^3$ on the main protected circuit $P^1P^2P^3$, through a sound-phase compensating transforming device $O^4$ of known type, and their restraining and polarising circuits are energised through main circuit voltage transformers indicated at O.

Each of these relay devices is set to operate its contacts substantially instantaneously in the event of a fault of the appropriate kind occurring within a zone covering, say, 80 percent of the length of the protected section $P^1P^2P^3$, but the impedance-settings of all six relay devices are altered (in the manner described with reference to Figure 5) to cover a zone extending for, say, 120 percent of the length of the section, on operation of a relay Q having six changeover contacts respectively associated with the six relay devices. The manner in which this relay Q is caused to operate will be described later.

It will be clear that, in the event of a fault in the middle portion of the protected section $P^1P^2P^3$, the appropriate relay devices at both ends of the section will operate instantaneously to energise the trip coil $P^4$ of the main circuit-breaker P at the adjacent end, so that the section will be instantaneously cut out at both ends. If, however, the fault occurs near one end of the protected section, say at the end remote from that illustrated, the appropriate relay devices at the remote end only will operate to cut out the section instantaneously at that end, for the relay devices at the home end will not operate owing to the fact that the fault is outside the instantaneous zone for such relay devices. To obtain the desired substantially instantaneous operation at both ends in such a case, each relay device on operation causes a high frequency transmitter of any suitable known type diagrammatically indicated at R to transmit a signal to the other end where a receiver (indicated at $R^1$) responsive to such signal operates a contact $R^2$ and thereby energises the relay Q, thus causing the six relay devices $M^1M^2M^3N^1N^2N^3$ to alter their impedance settings to cover the 120 degree zone, which embraces the fault, so that the appropriate relay devices at the home end on receipt of the signal from the remote end will operate to trip the circuit-breaker P at the home end also. The high frequency signals are preferably superimposed on two of the conductors $P^1P^3$ of the main circuit through a line coupling system indicated at $R^3$. The same line coupling system $R^3$ is utilised for the received signals, a hybrid transformer $R^4$ of known type being provided to prevent interference between transmitted and received signals, each receiver $R^1$ being tuned to the frequency of the signals transmitted from the other end.

It will thus be clear that for every fault within the protected section $P^1P^2P^3$, the section will be cut out substantially instantaneously. If for any reason the receiver $R^1$ should happen to pick up a high frequency signal from some extraneous source (for example in the case of a distant external fault) at a time when there is no fault within the protected section, its operation will not cause the circuit-breaker P to open since the relay devices themselves will not operate. It is however, preferable, to utilise different frequencies for the signal transmissions on neighbouring sections and to provide barrier devices $R^5$ on the main circuit to prevent the signals from passing along the main conductors into other sections. Again, in the event of a fault just outside the protected section, say at the remote end, the relay devices at the home end will not operate owing to the fact that the fault distance is outside their normal setting range, and those on the protected section at the remote end will not operate owing to their directional properties.

It is, however, desirable to provide time-lag back-up protection for external faults in order to guard against any failure of the protective gear on the faulty section. For this purpose, six further relay devices (three $S^1S^2S^3$ for earth faults and three $T^1T^2T^3$ for inter-phase faults) are provided. These relay devices are preferably of the mho type incorporating a directional feature, but can be of simpler construction than the relay devices according to the present invention, since they need not be highly accurate in their impedance measurement and do not require the memory device provided for dealing with impedance values near zero or the voltage-limiting compensation. These back-up relay devices may be of the kind shown in Figure 9, having a rectifier comparator circuit $B^4C^4$ and relay element A similar to that used in the present invention, one of the two A. C. inputs being derived through a simple transformer U from the main circuit current only, whilst the other A. C. input is derived from the secondary $U^1$ of a mixing transformer $U^5$ having two primary windings, one of which $U^2$ is in series with the secondary of the transformer U whilst the other $U^3$ is derived through a suitable impedance $U^4$ from the voltage transformer D, so as to depend on the vector sum of the main circuit voltage and current.

The relay devices $S^1S^2S^3T^1T^2T^3$ are set to operate instantaneously in the event of a fault occurring within a zone covering the protected section and also the whole of the next section in the appropriate direction, and they are provided to serve two purposes, namely to guard against failure of the protective gear on the next section and also to guard against failure of the high frequency signal from the remote end in the event of an internal fault near the remote end. These relay devices act on operation to energise two time-lag relays $Q^1$ and $Q^2$. The relay $Q^1$ has a relatively short time-lag and acts at the end of such time-lag to energise the relay Q to alter the settings of the main relay devices $M^1M^2M^3N^1N^2N^3$, so that if the high frequency signal is not received from the remote end when there is a fault on the protected section near that end, the main relay devices at the home end will act, after the short time-lag of the relay $Q^1$, to trip the circuit-breaker P. The other time-lag relay $Q^2$ has a longer time-lag and directly energises the trip coil $P^4$ at the end of its time-lag to provide back-up protection for the system.

It is desirable to provide a self-sealing contactor V in parallel with the trip coil $P^4$ in order to ensure proper operation of the trip coil, even if the relay device, which caused its energisation, should happen to open its contacts again very quickly. This contactor V is controlled by an auxiliary switch $P^5$ on the circuit-breaker, which opens to deenergise the contactor V when the circuit-breaker opens.

Although the present invention finds its most advantageous use, as above described, as a relay device having a mho characteristic for accurate impedance measurement, it also has useful application as a directional relay device with impedance control, for example for use as a starting relay in one or other of the known types of protective arrangement requiring directional initiation, wherein the impedance control feature does not call for highly accurate impedance measurement and serves merely for the purpose of distinguishing between normal load conditions and fault conditions on the main circuit.

For this purpose, as shown in Figure 10 the relay device may be arranged generally in the manner above described for accurate impedance measurement, with the following modifications. The polarising and restraining circuits are no longer derived from the same main circuit voltage source, but from two different main circuit voltage sources not in phase with one another, for example, from two different phases of the main circuit voltage transformer $W^1W^2W^3$, and the series impedances in the polarising and restraining circuits are so chosen as to give such phase shifts as to bring the polarising and restraining currents approximately into phase with one another. Thus one of the series impedances may comprise capacitance X and resistance $X^1$ in series, and the other inductance $X^2$ and resistance $X^3$ in series. It is also unnecessary in this arrangement to provide the memory device or the voltage-limiter compensation or the tapping arrangements for adjusting the impedance setting of the relay device. In other respects, however, this arrangement will be similar to the accurate distance-measuring relay device above described.

It will be appreciated that the foregoing arrangements have been described by way of example only and may be modified in various ways within the scope of the invention.

What I claim as my invention and desire to secure by Letters Patent is:

1. A directional and impedance relay device responsive to the conditions in a main A. C. electric circuit and comprising a polarized D. C. relay element, a rectifier comparator circuit for applying differentially to such element two rectified A. C. inputs, means for deriving from the main circuit an operating current proportional to a current of the main circuit, a restraining current proportional to a voltage of the main circuit and a polarising current dependent on a voltage of the main circuit and approximately in phase with the restraining current, means whereby one of the said A. C. inputs comprises the vectorial difference between the operating current and the sum of the restraining and polarising currents, and means whereby the other A. C. input comprises the vectorial difference between the restraining current and the sum of the operating and polarising currents.

2. A directional and impedance relay device as claimed in claim 1, in which the rectifier comparator circuit comprises two full-wave bridge rectifiers whose input terminals are respectively energized by the two A. C. inputs, an output circuit connecting the output terminals of the two bridge rectifiers in such senses as to permit current to circulate around the output circuit, and means for connecting the relay element across such output circuit.

3. A directional and impedance relay device as claimed in claim 2, including a compensating voltage-limiting device through which the restraining current is derived from the main circuit voltage, such device comprising a pair of opposed half-wave rectifiers connected in parallel.

4. A directional and impedance relay device as claimed in claim 1, including a compensating voltage-limiting device through which the restraining current is derived from the main circuit voltage.

5. A directional and impedance relay device as claimed in claim 4, in which the voltage-limiting device comprises a pair of opposed half-wave rectifiers connected in parallel.

6. A directional and impedance relay device as claimed in claim 4, in which the voltage-limiting device comprises a reactor having an airgap magnetic core and a small magnetic shunt bridging the airgap.

7. A directional and impedance relay device responsive to the conditions in a main A. C. electric circuit and comprising a polarised D. C. relay element, a rectifier comparator circuit for applying differentially to such element two rectified A. C. inputs, means for deriving from the main circuit an operating current proportional to a current of the main circuit, a restraining current proportional to a voltage of the main circuit and a polarising current dependent on a voltage of the main circuit and approximately in phase with the restraining current, two mixing transformers each having a secondary winding and three primary windings, means whereby the two A. C. inputs are fed to the rectifier comparator circuit respectively from the secondary windings of the two mixing transformers, and means for connecting the three primary windings of one mixing transformer in series respectively with those of the other mixing transformer in three circuits respectively energized by the operating current, the restraining current and the polarising current, the senses in which such windings are connected being such that one of the said A. C. inputs comprises the vectorial difference between the operating current and the sum of the restraining and polarising currents and the other A. C. input comprises the vectorial difference between the restraining current and the sum of the operating and polarising currents.

8. A directional and impedance relay device as claimed in claim 7, in which the rectifier comparator circuit comprises two full-wave bridge rectifiers whose input terminals are respectively energized by the two A. C. inputs, an output circuit connecting the output terminals of the two bridge rectifiers in such senses as to permit current to circulate around the output circuit, and means for connecting the relay element across such output circuit.

9. A directional and impedance relay device as claimed in claim 8, including a compensating voltage-limiting device through which the restraining current is derived from the main circuit voltage.

10. A directional and impedance relay device as claimed in claim 7, in which the rectifier comparator circuit comprises two output leads one of which is connected between the mid-points of the two mixing transformer secondary windings, means for connecting the polarised D. C. relay element between such output leads, and two pairs of half-wave rectifiers connected between the ends of the mixing transformer secondary windings and the second output lead, the two rectifiers of the pair associated with one secondary winding being connected in a sense opposite to that of the pair of rectifiers associated with the other secondary winding so as to permit current to circulate around the output circuit constituted by the two output leads.

11. A directional and impedance relay device as claimed in claim 7, including a compensating voltage-limiting device through which the restraining current is derived from the main circuit voltage.

12. A directional and impedance relay device responsive to the conditions in a main A. C. electric circuit for accurate impedance measurement for protective purposes and arranged to have a mho characteristic, and comprising a polarised D. C. relay element, a rectifier comparator circuit for applying differentially to such element two rectified A. C. inputs, means for deriving from the main circuit an operating current proportional to the main circuit current associated with the impedance to be measured, means for deriving from the main circuit a restraining current proportional to the main circuit voltage associated with the impedance to be measured, means for deriving from such main circuit voltage a polarising current approximately in phase with the restraining current, means whereby one of the said A. C. inputs comprises the vectorial difference between the operating current and the sum of the restraining and polarising currents, and means whereby the other A. C. input comprises the vectorial difference between the restraining current and the sum of the operating and polarising currents.

13. A directional and impedance relay device as claimed in claim 12, including in the voltage-responsive circuit through which the polarising current is obtained a memory device for temporarily sustaining the polarising current.

in the event of a sudden fall in the main circuit voltage from which such current is derived.

14. A directional and impedance relay device as claimed in claim 13, in which the voltage-responsive deriving means are such that the restraining and polarising currents are approximately in phase with the main circuit voltage from which they are derived, and the memory device comprises a series resonant circuit tuned to the frequency of the main circuit.

15. A directional and impedance relay device as claimed in claim 13, in which the voltage-responsive deriving means are such that the restraining and polarising currents are approximately 90 degrees out of phase with the main circuit voltage from which they are derived, and the memory device comprises a parallel resonant circuit tuned to the frequency of the main circuit.

16. A directional and impedance relay device as claimed in claim 12, in which the rectifier comparator circuit comprises two full-wave bridge rectifiers whose input terminals are respectively energised by the two A. C. inputs, an output circuit connecting the output terminals of the two bridge rectifiers in such senses as to permit current to circulate around the output circuit, and means for connecting the relay element across such output circuit.

17. A directional and impedance relay device as claimed in claim 16, including in the voltage-responsive circuit through which the polarising current is obtained a memory device for temporarily sustaining the polarising current in the event of a sudden fall in the main circuit voltage from which such current is derived.

18. A directional and impedance relay device as claimed in claim 17, including a compensating voltage-limiting device through which the restraining current is derived from the main circuit voltage.

19. A directional and impedance relay device as claimed in claim 12, wherein the means for obtaining the two A. C. inputs from the operating, restraining and polarising currents comprises two mixing transformers each having a secondary winding and three primary windings, means whereby the two A. C. inputs are fed to the rectifier comparator circuit respectively from the two mixing transformer secondary windings, and means for connecting the three primary windings of one mixing transformer in series in the appropriate senses respectively with those of the other mixing transformer in three circuits respectively energised by the operating restraining and polarising currents.

20. A directional and impedance relay device as claimed in claim 19, in which the rectifier comparator circuit comprises two full-wave bridge rectifiers whose input terminals are respectively energised by the two A. C. inputs, an output circuit connecting the output terminals of the two bridge rectifiers in such senses as to permit current to circulate around the output circuit, and means for connecting the relay element across such output circuit.

21. A directional and impedance relay device as claimed in claim 19, including in the voltage-responsive circuit through which the polarising current is obtained a memory device for temporarily sustaining the polarising current in the event of a sudden fall in the main circuit voltage from which such current is derived.

22. A directional and impedance relay responsive to the conditions in a main A. C. electric circuit for use as a directional relay with impedance control, and comprising a polarised D. C. relay element, a rectifier comparator circuit for applying differentially to such element two rectified A. C. inputs, means for deriving from the main circuit an operating current proportional to a current of the main circuit, means for deriving from the main circuit a restraining current proportional to a voltage of the main circuit, means for deriving from the main circuit a polarising current dependent on a voltage of the main circuit different from that from which the restraining current is derived, impedances in series with the voltage-responsive deviation circuits whereby the restraining and polarising currents are brought approximately into phase with one another, means whereby one of the said A. C. inputs comprises the vectorial difference between the operating current and the sum of the restraining and polarising currents, and means whereby the other A. C. input comprises the vectorial difference between the restraining current and the sum of the operating and polarising currents.

23. A directional and impedance relay device as claimed in claim 22, wherein the means for obtaining the two A. C. inputs from the operating restraining and polarising currents comprises two mixing transformers each having a secondary winding and three primary windings, means whereby the two A. C. inputs are fed to the rectifier comparator circuit respectively from the two mixing transformer secondary windings, and means for connecting the three primary windings of one mixing transformer in series in the appropriate senses respectively with those of the other mixing transformer in three circuits respectively energised by the operating restraining and polarising currents.

24. A directional and impedance relay device as claimed in claim 23, in which the rectifier comparator circuit comprises two full-wave bridge rectifiers whose input terminals are respectively energised by the two A. C. inputs, an output circuit connecting the output terminals of the two bridge rectifiers in such senses as to permit current to circulate around the output circuit, and means for connecting the relay element across such output circuit.

25. A directional and impedance relay device as claimed in claim 23, including a compensating voltage-limiting device through which the restraining current is derived from the main circuit voltage.

26. A directional and impedance relay device as claimed in claim 22, in which the rectifier comparator circuit comprises two full-wave bridge rectifiers whose input terminals are respectively energised by the two A. C. inputs, an output circuit connecting the output terminals of the two bridge rectifiers in such senses as to permit current to circulate around the output circuit, and means for connecting the relay element across such output circuit.

27. A directional and impedance relay device as claimed in claim 22, including a compensating voltage-limiting device through which the restraining current is derived from the main circuit voltage, such device comprising a pair of opposed half-wave rectifiers connected in parallel.

References Cited in the file of this patent

UNITED STATES PATENTS

| | | |
|---|---|---|
| 2,432,328 | Morris | Dec. 9, 1947 |
| 2,479,345 | Goldsborough | Aug. 16, 1949 |
| 2,542,809 | Goldsborough | Feb. 20, 1951 |